United States Patent Office
3,700,617
Patented Oct. 24, 1972

3,700,617
EPOXY-TERMINATED POLYIMIDES
Robert F. Golownia, Warrensville Heights, and Stanley
Oswitch, University Heights, Ohio, assignors to Ferro
Corporation, Cleveland, Ohio
No Drawing. Filed Sept. 22, 1969, Ser. No. 860,052
Int. Cl. C07d 27/52
U.S. Cl. 260—326 C
6 Claims

ABSTRACT OF THE DISCLOSURE

Thermally stable epoxy terminated polyimides are employed with a fiber mat such as fiberglass to prepare thermosetting high temperature resistant laminates stable at temperatures as high at 600° F. The novel polyimides have the formula:

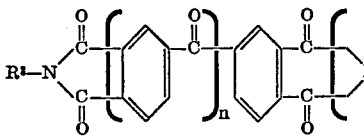

wherein R and R' are propoxides, $R^2$ is $SO_2$, $CH_2$ or O and $n$, $n'$, $w$, $x$ and $y$ are integers of from 0 to 1, providing that when $x$ is 1, $y$ is 1.

This invention relates to thermally stable epoxy terminated polyimides, to alkenyl polyimide intermediates, and to thermosetting high temperature laminates containing said imides.

In recent years, reinforced plastics have been utilized to an ever increasing extent in the construction of modern aircraft. Appreciable amounts of such plastics have been used to effect important weight savings on both interior and exterior structures. For the supersonic transport aircraft however, which it is estimated will have approximately 10,000 square feet of its exterior made of reinforced plastic, the present epoxy resins are unsuitable because of the high skin temperatures of 400 to 500° F. which will be developed during supersonic flight.

It has now been discovered that epoxy terminated polyimide compounds prepared from an aromatic dianhydride and one or more unsaturated amines, which have been oxidized to produce terminal epoxy groups, have improved thermal resistant properties not possessed by the heretofore employed epoxy resins, and additionally do not have the voids of the heretofore employed polyimides, caused by the release of water during their cure.

More particularly the novel epoxidized polyimides of the invention can be represented by the formula:

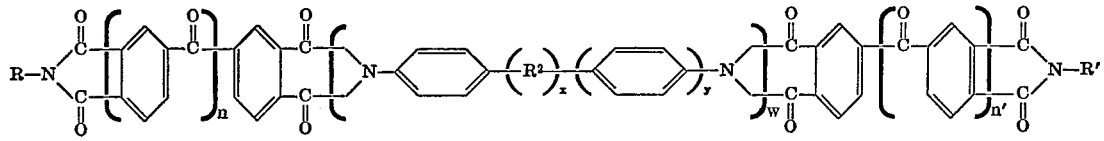

wherein R and R' are propoxides, $R^2$ is $SO_2$, $CH_2$ or O and $n$, $n'$, $w$, $x$ and $y$ are integers of from 0 to 1 providing that when $x$ is 1, $y$ is 1. Polyimides of the type wherein $w$ is 1 in the above formula can be prepared by reacting an aromatic diamine and an aromatic dianhydride in a molar ratio of about 1 to 2 in the presence of a solvent which is preferably a dehydrating agent and preferably in the presence of a proton acceptor to prepare the dianhydride intermediate. Exemplary of suitable aromatic amines are benzidine, diaminodiphenyl ether, diaminodiphenyl sulfone, P,P'-methylene dianiline, and orth, para- or meta-phenylene diamine. The anhydride can be pyromellitic dianhydride or benzophenonetetracarboxylic dianhydride. A suitable dehydrating agent or solvent is acetic anhydride, and pyridine is a suitable proton acceptor. The intermediate can then be reacted with an unsaturated amine such as allyl amine or isopropenyl amine in a molar ratio of from about 1 to 2. The resultant alkenyl terminated intermediate of the formula:

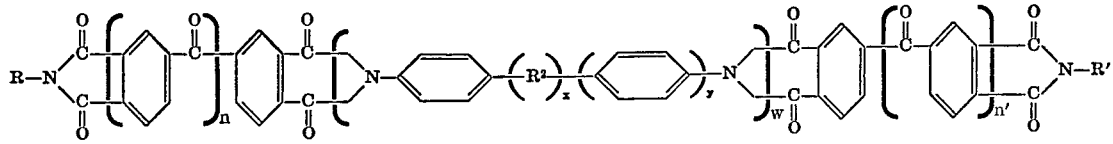

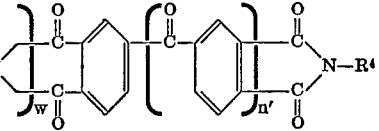

wherein $R^2$, $n$, $n'$, $w$, $x$ and $y$ are as previously defined and $R^3$ and $R^4$ are alkenyl of 3 carbon atoms, can be oxidized with an acid derived from hydrogen peroxide and containing a pair of oxygen atoms directly linked such as peracetic acid and pertrifluoroacetic acid.

To prepare the novel thermally resistant laminates of the invention the epoxidized polyimide is dissolved in a suitable solvent along with a curing catalyst. The resulting solution is then applied to a suitable fiber, fabric or mat which is stable at temperatures of 400 to 600° F. Exemplary of suitable fibers which can be employed as fabrics or mats are fiberglass, graphite, carbon, asbestos, alumina, boron and boron-carbide. Suitable solvents are those which are vaporizable at temperatures of less than about 200° C. and include chloroform, dimethylformamide, dimethylacetamide and methylethyl ketone. Suitable catalysts are those formed from boron trifluoride and amines such as pyridine, monoethylamine and piperidine. The catalysts can be prepared by the method described in C. H. Smith, A.C.S., Div. of Organic Coating and Plastics Chem., 28(2), 217–225, September 1968, and are generally employed in an amount sufficient to supply about one to three parts of catalyst per hundred parts of resin.

After the solution is applied to the fiber, fabric or mat and the solvent removed by evaporation, the resultant pre-preg can be cut and layered, and then cured in a heated press.

The following examples will serve to illustrate the invention and its preferred embodiments. All parts and percentages in said examples are by weight unless otherwise indicated.

EXAMPLE 1

Preparation of N,N' - diallyl - 3,4,3',4' - benzophenonetetracarboxy diimide

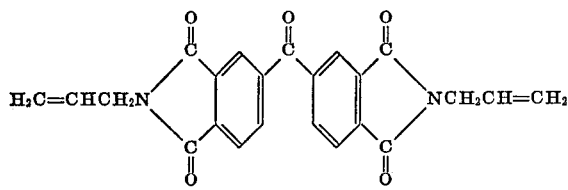

One mole of benzophenonetetracarboxylic dianhydride (BTDA) was dissolved in a mixture of two moles of acetic anhydride and two moles of pyridine in a resin reaction flask fitted with a stirrer, thermometer and reflux condenser. Two moles of allylamine were then mixed with two additional moles of pyridine and the resultant solution added over a period of 30 to 60 minutes to the BTDA/acetic anhydride-pyridine mixture with stirring. After agitation for about six hours at room temperature, the mixture was allowed to stand overnight during which period precipitation of the product occurred. Methanol was then added to complete the precipitation and the product was subsequently filtered off. The crude product was dissolved in hot toluene, treated with decolorizing carbon and allowed to crystallize. The crystalline material had a melting point in the range of 153–156° C.

EXAMPLE 2

Preparation of N,N'-diglycidyl-3,4,3',4'-benzophenonetetracarboxy diimide

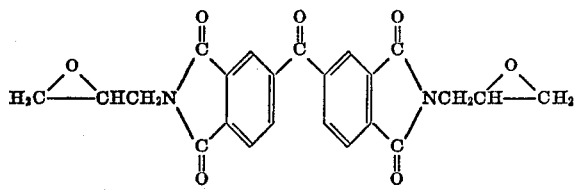

The compound of Example 1 was oxidized with 40% peracetic acid by refluxing the mixture in chloroform for 18 hours. The reaction mixture was then extracted several times with 5% aqueous potassium carbonate, after which precipitation of the product was effected by the addition of petroleum ether. Recrystallization of the crude product from methyl ethyl ketone yielded a white crystalline material, melting at 159–161° C. Instrumental and chemical analysis indicated the product to be the desired product.

EXAMPLE 3

100 parts of the product of Example 2 was dissolved in hot chloroform and 2 parts of a boron trifluoride amine complex catalyst added, said catalyst prepared by the method disclosed supra. The resultant polyimide-catalyst solution was supplied to a glass fabric and the chloroform removed by evaporation to produce the pre-preg. The dry pre-preg was cut and layered, and then inserted into a heated press for cure. The press cure was accomplished in one hour at 190° C., and the post cure in 12 hours at 225° C. Samples of the resulting laminates were subjected to isothermal gravimetric analysis at 550° F. and 600° F. in an air circulating oven in order to assess thermal stability. The weight losses calculated both after 24 and 70 hours were as follows:

| Aging temperature | 550° F. | 600° F. |
|---|---|---|
| Weight loss after 24 hours, percent | 1.95 | 3.38 |
| Weight loss after 70 hours, percent | 2.55 | 4.14 |

EXAMPLE 4

Preparation of N,N'-diisopropenyl pyromellitimide

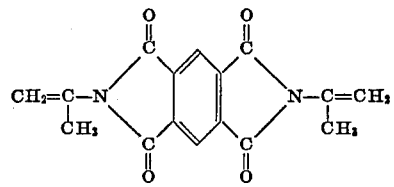

In accordance with the procedure of Example 1, one mole of pyromellitic dianhydride and two moles of isopropenyl amine are reacted to produce the subject product.

EXAMPLE 5

Preparation of N,N'-diisopropoxide pyromellitimide

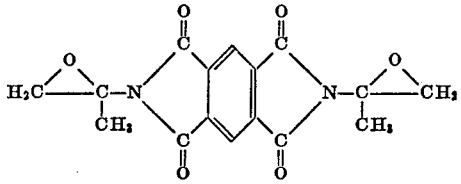

In accordance with the procedure of Example 2 the subject product is produced by oxidation of the product of Example 4.

EXAMPLE 6

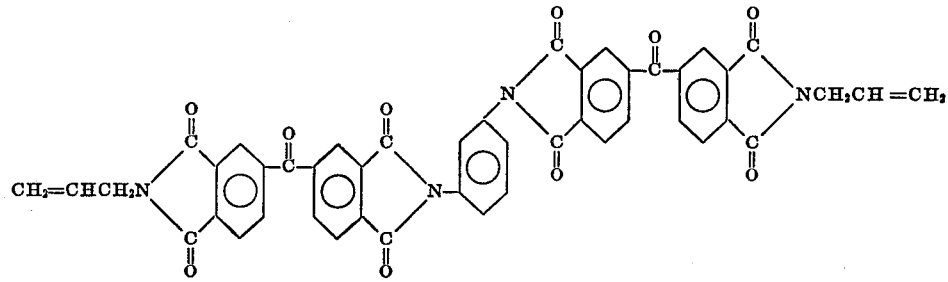

In accordance with the procedure of Example 1, the subject product is produced by reacting two moles of pyromellitic dianhydride with one mole of meta-phenylene diamine and the resultant product reacted with two moles of diallyl amine to produce the desired product.

EXAMPLE 7

In accordance with the procedure of Example 1, subject product is prepared by reacting one mole of benzophenonetetracarboxylic dianhydride and two moles of isopropenyl amine.

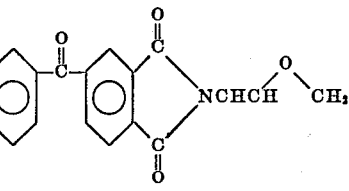

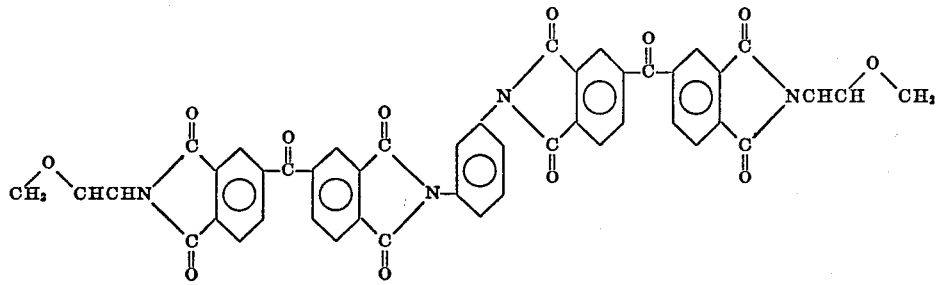

In accordance with the procedure of Example 2, the product of Example 6 is oxidized to produce the desired product.

EXAMPLE 8

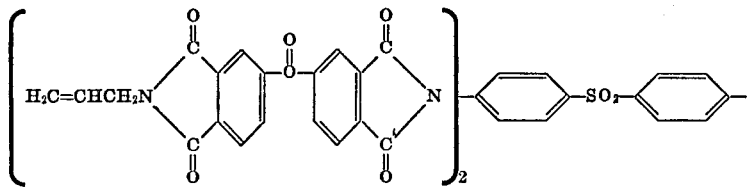

In accordance with the procedure of Example 1, the subject product is produced by reacting two moles of benzophenonetetracarboxylic dianhydride with one mole of diaminodiphenylsulfone and the resultant product reacted with two moles of diallyl amine.

EXAMPLE 9

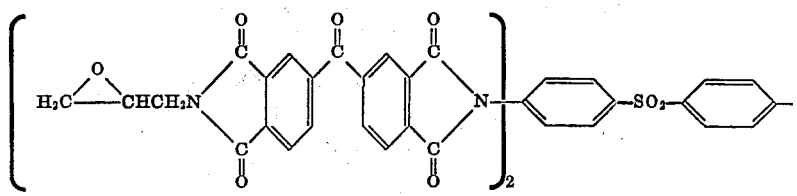

In accordance with the procedure of Example 2, the compound of Example 8 is oxidized to produce the desired product.

EXAMPLE 10

Preparation of N,N'-diisopropenyl-3,4,3',4'-benzophenonetetracarboxy diimide

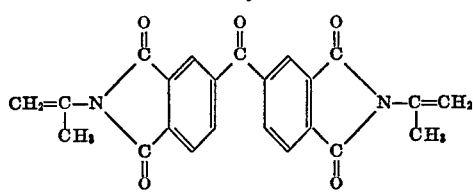

EXAMPLE 11

Preparation of N,N'- diisopropoxide - 3,4,3',4'- benzophenonetetracarboxy diimide

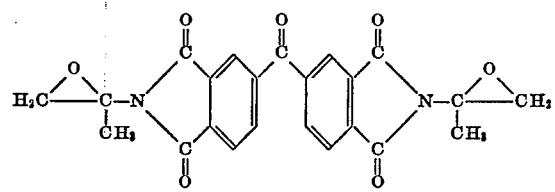

In accordance with the procedure of Example 2, the compound of Example 10 is oxidized to produce the desired product.

EXAMPLES 12–15

In accordance with the procedure of Example 3, the compounds of Examples 5, 7, 9 and 11 can be incorporated into laminates which show similar thermal stability to the product of Example 3.

What is claimed is:

1. A compound of the formula:

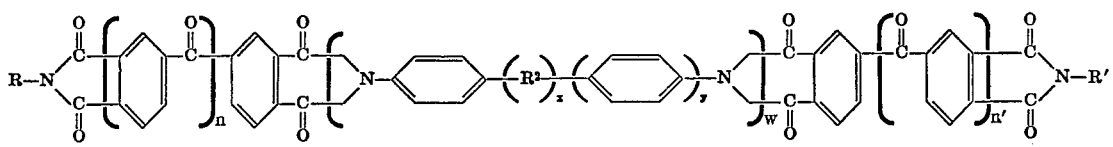

wherein R and R' are selected from the class consisting of:

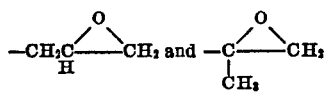

$R^2$ is $SO_2$, $CH_2$ or O, and $n, n', w, x$ and $y$ are integers of from 0 to 1, providing that when $x$ is 1, $y$ is 1.

2. A compound of claim 1, namely

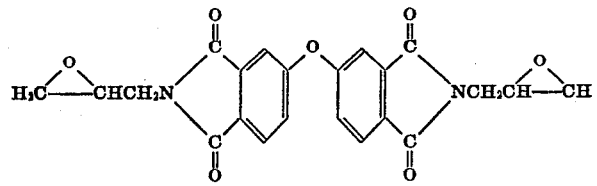

3. A compound of claim 1, namely

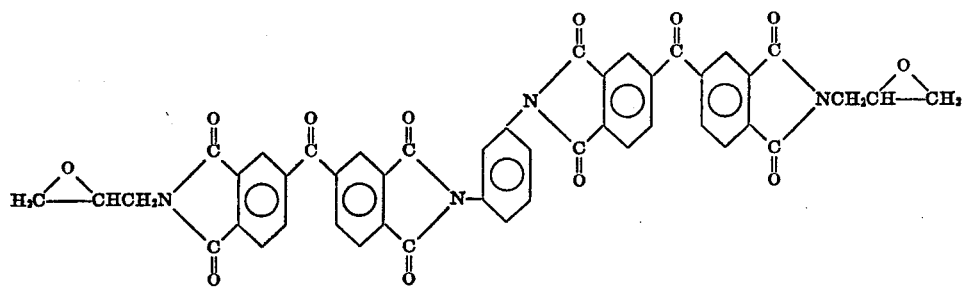

4. A compound of claim 1, namely

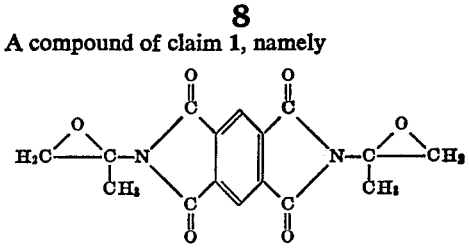

5. A compound of claim 1, namely

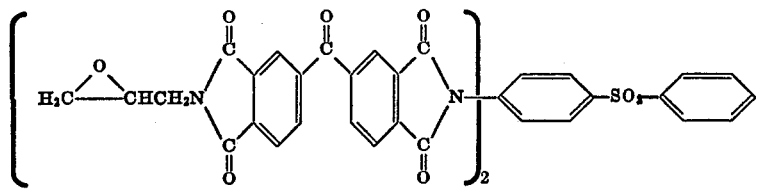

6. A compound of claim 1, namely

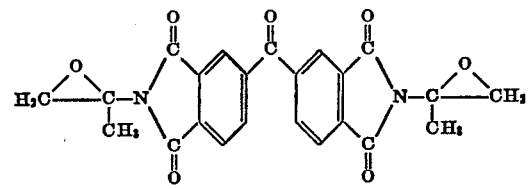

References Cited
UNITED STATES PATENTS
3,455,949  7/1969  Porret et al. _____ 260—326

ALEX MAZEL, Primary Examiner
J. A. NARCAVAGE, Assistant Examiner

U.S. Cl. X.R.
260—37 EP, 78 TF, 326 N, 326 S